Figure 1:
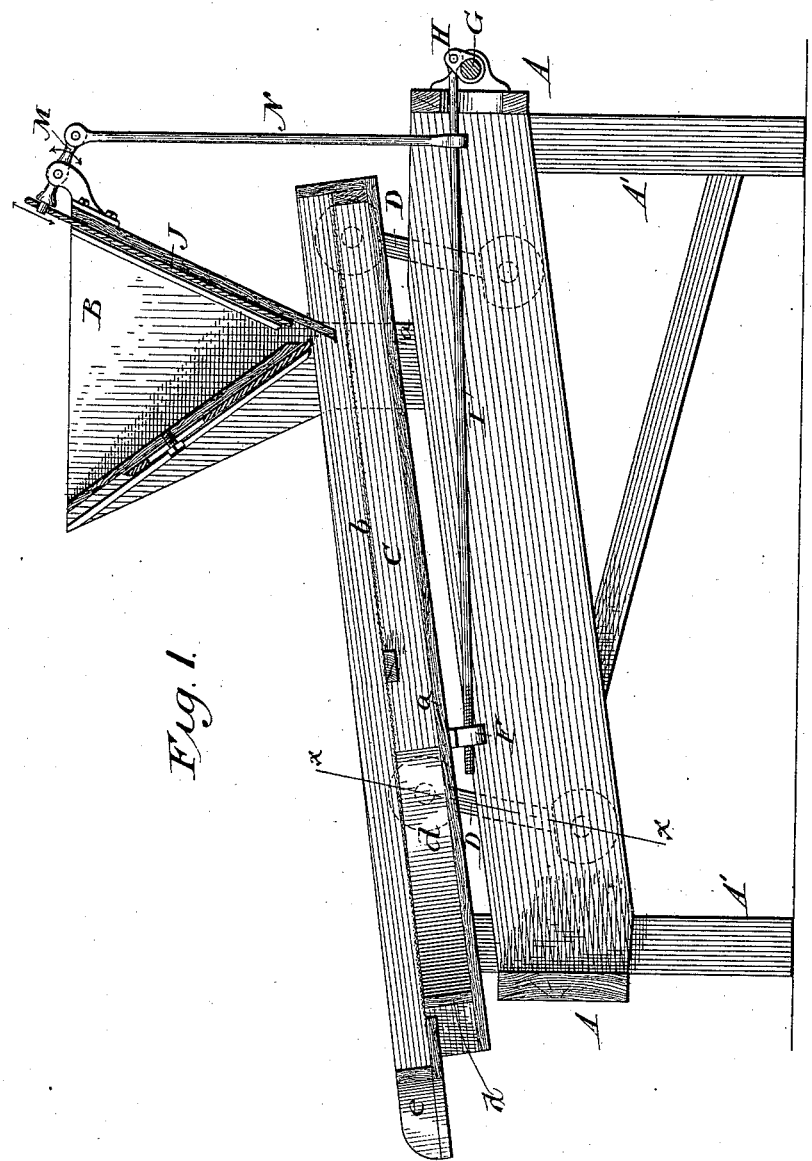

(No Model.)

2 Sheets—Sheet 1.

G. & A. RAYMOND.
MACHINE FOR BOLTING MEAL, &c.

No. 303,665.

Patented Aug. 19, 1884.

Attest
Sidney P. Hollingsworth
Newton Wyckoff

Inventor:
George Raymond
Albert Raymond
By Philip T. Dodge
Atty (No Model.) 2 Sheets—Sheet 2.
G. & A. RAYMOND.
MACHINE FOR BOLTING MEAL, &c.
No. 303,665. Patented Aug. 19, 1884.
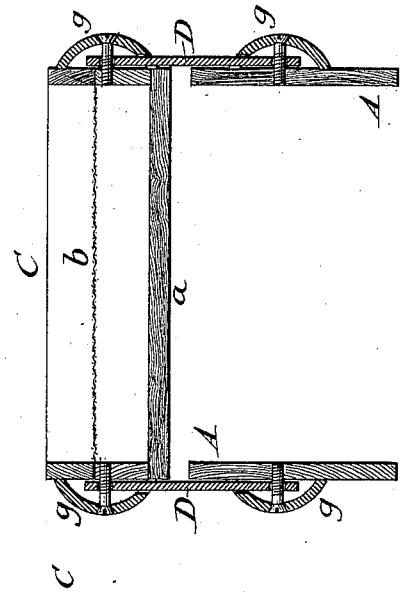
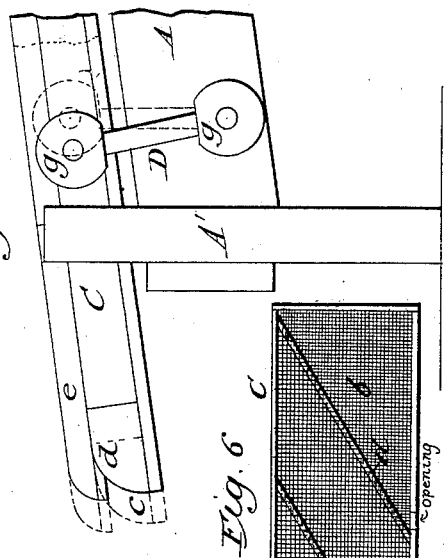
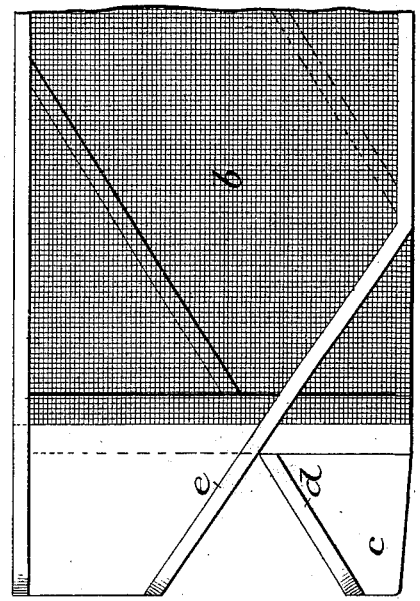
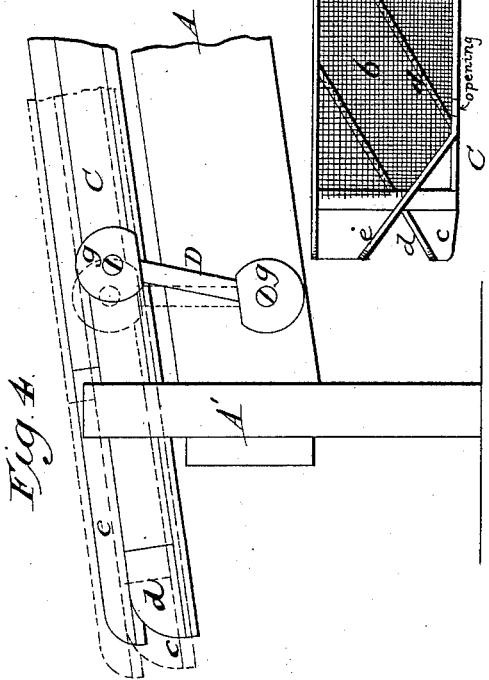
Attest
Sidney P. Hollingsworth
Newton Wyckoff.
Inventor.
George Raymond
Albert Raymond
By Philip T. Dodge
Atty.

UNITED STATES PATENT OFFICE.

GEORGE RAYMOND AND ALBERT RAYMOND, OF CHICAGO, ILLINOIS.

MACHINE FOR BOLTING MEAL, &c.

SPECIFICATION forming part of Letters Patent No. 303,665, dated August 19, 1884.

Application filed October 24, 1882. (No model.)

*To all whom it may concern:*

Be it known that we, GEORGE RAYMOND and ALBERT RAYMOND, of Chicago, Cook county, Illinois, have invented certain new and useful Improvements in Machines for Bolting Meal, &c., of which the following is a specification.

The aim of the invention is to produce a simple and efficient shaking bolt to which the material may be automatically and positively delivered, and by which the material may be properly graded and delivered at different points.

Referring to the accompanying drawings, Figure 1 represents a longitudinal vertical section through the middle of the machine. Fig. 2 is a top plan view of the screen. Fig. 3 is a vertical section on the line *x x*. Figs. 4 and 5 are diagrams illustrating the motions of the screen. Fig. 6 is a top plan view of the screen, adapted to grade material and deliver the same at different points.

A represents a strong rigid frame, provided with sustaining-legs A'. To this frame, near one end, is secured an elevated feed-hopper, B, the mouth of which extends transversely across the frame. Above the main frame we mount a rectangular inclined screen-frame, C, with its upper end beneath the mouth of the hopper. The screen is supported by four links, D, pivoted at their lower ends to the main frame and at their upper ends to the screen-frame. Each link has its ends covered by plates or caps *g*, recessed on the inner side to fit loosely over it and confine the screws, which also serve as pivots for the links. A crank-shaft, G, is mounted transversely in bearings at one end of the main frame, and its crank provided with a pitman-rod, I, having its opposite end threaded and screwed into a plate, F, secured rigidly to the under side of the screen-frame. By screwing the pitman forward and backward the operative positions of the links may be changed, so as to vary the motion of the screen in order to retard or quicken the passage of the meal over its surface. The screen-frame is provided with a tight bottom, *a*, by which it is converted into a shallow tray. A bolting-surface of cloth or equivalent material is extended throughout the entire frame at a short distance above the bottom, and secured at its edges. Between the bottom *a* and the screen-surface a bar, *d*, is extended diagonally across the frame from one side nearly to the other. Above the screening-surface a bar, *e*, is extended obliquely in the opposite direction, as shown. The upper bar deflects the coarse material or tailings which pass over the surface of the screen to the right side of the machine, while the bar *d* deflects the fine material which has fallen through the screen to the opposite side of the machine, the coarse and fine products being thus delivered at different points. When a further gradation of the material is required, we propose to provide a screening-surface consisting of transverse sections of different degrees of fineness, and to provide a series of the bars *d* thereunder, as represented in Fig. 6, to deliver the different grades of material through openings provided for the purpose at the side.

To feed material from the hopper to the screen, we employ a reciprocating slide or plunger, J, located on one side of the hopper, with its lower end in position to force the material through the throat of the hopper. The edge of this slide will extend across the hopper from side to side, so as to act through the entire length of the throat. The surface of this slide is exposed to the material within the hopper, which rests against the same, so that the movement of the slide tends materially to agitate and loosen the mass and keep the same in such condition that it will flow readily downward. The reciprocation of the slide is effected by means of a pivoted lever, M, mounted in an arm on the side of the hopper, with one end inserted through an opening in the slide, and the opposite end pivoted to a rod, N, the lower end of which encircles the screen-operating pitman I, as in Fig. 1. On the opposite side of the hopper from the face we mount an adjustable gate, by which the size of the opening may be varied to change the rate of feed.

Having thus described our invention, what we claim is—

In combination with the main frame, the reciprocating screen-frame, the crank-shaft located at one end of the main frame, the centrally-located pitman extending thence to the under side of the screen-frame, the hopper, the reciprocating feed-gate, the lever M, and the rod N, connecting the lever and pitman.

GEORGE RAYMOND.
ALBERT RAYMOND.

Witnesses:
GEO. WOODRUFF,
W. W. LAING.